June 2, 1970 R. W. PHILBRICK ET AL 3,515,881

PANNING CONTROL CIRCUIT FOR ELECTRONIC IMAGE MOTION STABILIZATION SYSTEMS

Filed June 8, 1965 4 Sheets-Sheet 1

INVENTORS
EFRAIM R. ARAZI
RICHARD W. PHILBRICK

BY Stanley Belsky
Robert Nathans
ATTORNEYS

INVENTORS
EFRAIM R. ARAZI
RICHARD W. PHILBRICK
BY Stanley Belsky
Robert Nathan
ATTORNEYS INVENTORS
EFRAIM R. ARAZI
RICHARD W. PHILBRICK
BY Stanley Bilsky
Robert Nathans
ATTORNEYS

| TRIGGER AMPLIFIER OUTPUT | $T_1$ | $T_2$ | N AND GATE OUTPUT |
|---|---|---|---|
| GROUND | ON | OFF | MARK |
| POSITIVE | ON | ON | NO MARK |
| NEGATIVE | OFF | OFF | NO MARK |

INVENTORS
EFRAIM R. ARAZI
RICHARD W. PHILBRICK
BY Stanley Belsky
Robert Nathan
ATTORNEYS United States Patent Office 3,515,881

Patented June 2, 1970

3,515,881

PANNING CONTROL CIRCUIT FOR ELECTRONIC IMAGE MOTION STABILIZATION SYSTEMS

Richard W. Philbrick, Concord, and Efraim R. Arazi, Cambridge, Mass., assignors to Itek Corporation, Lexington, Mass., a corporation of Delaware Filed June 8, 1965, Ser. No. 462,322
Int. Cl. H01j *31/50, 39/12*
U.S. Cl. 250—213 4 Claims

ABSTRACT OF THE DISCLOSURE

An image motion stabilization system mounted on a support including transducer means to sense motions of the support and deflection means to deflect the image in a direction tending to cancel such motions. Panning control means are provided to prevent image deflection in response to transducer indications of less than two cycles per second so that the system may be panned.

Figure 1:
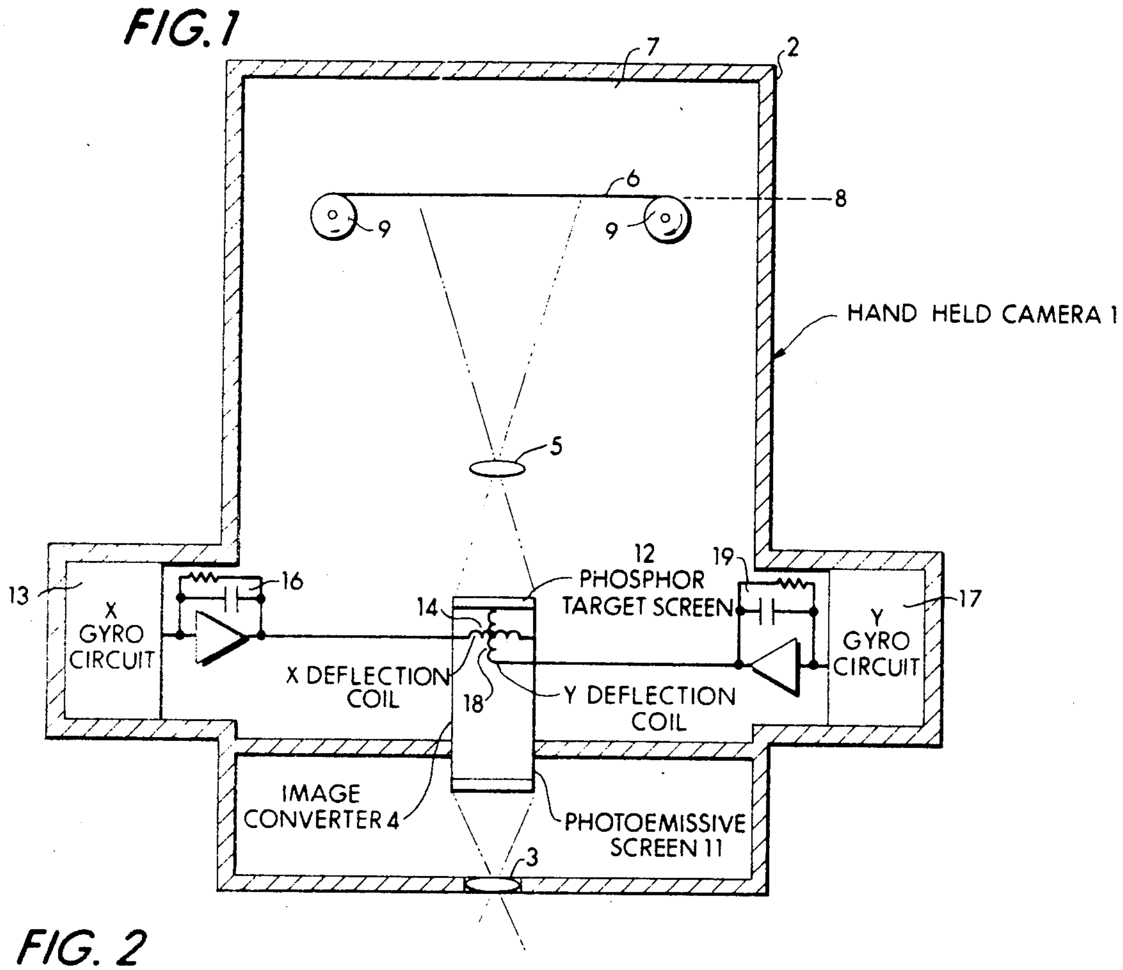

The present invention relates to devices for stabilizing an optical image in a field of view. More particularly the present invention relates to an image motion cancellation viewing system for cancelling apparent image motion of viewed images.

In a copending application assigned to a common assignee entitled "Data Pattern Motion Cancellation System," filed Aug. 7, 1964, Ser. No. 388,251, now U.S. Pat. No. 3,393,320, invented by Efraim R. Arazi, an image motion cancellation system is disclosed. In that application the broad environment for the problem of image motion is outlined. The system described in the copending application is limited in certain applications. For night photography, for example, and other dimly lighted environments, the light intensity may be too low for the light sensors to operate effectively. For applications involving images which are not sharply defined and for rapidly changing scenes, the system disclosed in the copending application is sometimes unable to lock on a desired image.

It is often desirable to photograph or telescopically view objects from moving vehicles such as automobiles, helicopters, trains, planes, boats and space vehicles. However the motion of these vehicles causes the viewed objects to "dance" so that it is often very difficult or impossible to discern, photograph, or televise details of the viewed objects. The problem is compounded when the objects are moving and the observer must track the moving object with an optical instrument. Also under these conditions observer fatigue can be quite severe. Generally speaking, the sharpness of a picture is determined by the smallest element in it that can independently represent a certain number of gray shades particularly in pictures taken with a short exposure time. The relatively few exposed grains and the randomness of the grain distribution in each element make it difficult to achieve a sufficiently high signal to noise ratio per element. Therefore, longer exposure may be desirable. However if camera motion occurs during the longer exposure period, the resulting "dance" or blur limits the smallest element that can have an independent number of gray shades. Accordingly, the need for a system to "freeze" the image and thereby eliminate the image "dance" is readily apparent in numerous areas such as aerial reconnaissance, television, map making, the military field in general, motion picture making, and in the field of photography in general.

Regarding aerial reconnaissance, one approach to this problem is to detect "pitch" and "yaw" of an aircraft (and hence a camera mount) by virtue of electrical transducers and utilize the signals generated thereby to actuate servo systems coupled to the camera mount to counteract the "pitch" and "yaw." Such an approach is obviously cumbersome and expensive since many pounds of equipment must be mechanically actuated. Also image "dance" in a telescopic gunsight presents obvious problems.

It is, therefore, an object of the present invention to provide a new and improved image motion cancellation system.

It is a further object of the present invention to provide a new and improved image motion cancellation system which may operate upon an image having relatively low light intensity.

It is a further object of the present invention to provide an image motion cancellation system which may operate upon images which are not sharply defined or which lack clarity.

It is yet a further object of the present invention to provide an image motion cancellation system particularly useful in aerial photography for eliminating intentional film motion, within each "take" or frame period, utilized in the prior art to provide image motion cancellation in accordance with the "*V/H*" ratio.

It is yet a further object of the present invention to provide a camera which may clearly and distinctly photograph objects although the camera itself may be wildly gyrating.

It is yet a further object of the present invention to provide optical viewing instruments such as cameras, telescopes, binoculars, gunsights, and television pickup tubes which eliminate "dance" due to random motions of the viewing instruments, due to the fact that they are hand held, vehicle mounted, or otherwise.

It is yet a further object of the present invention to provide a unique fire control system.

Further objects of the present invention will be apparent from the following description taken in conjunction with the following drawings in which:

FIG. 1 discloses a hand held camera built in accordance with the present invention.

Figures 2, 3:
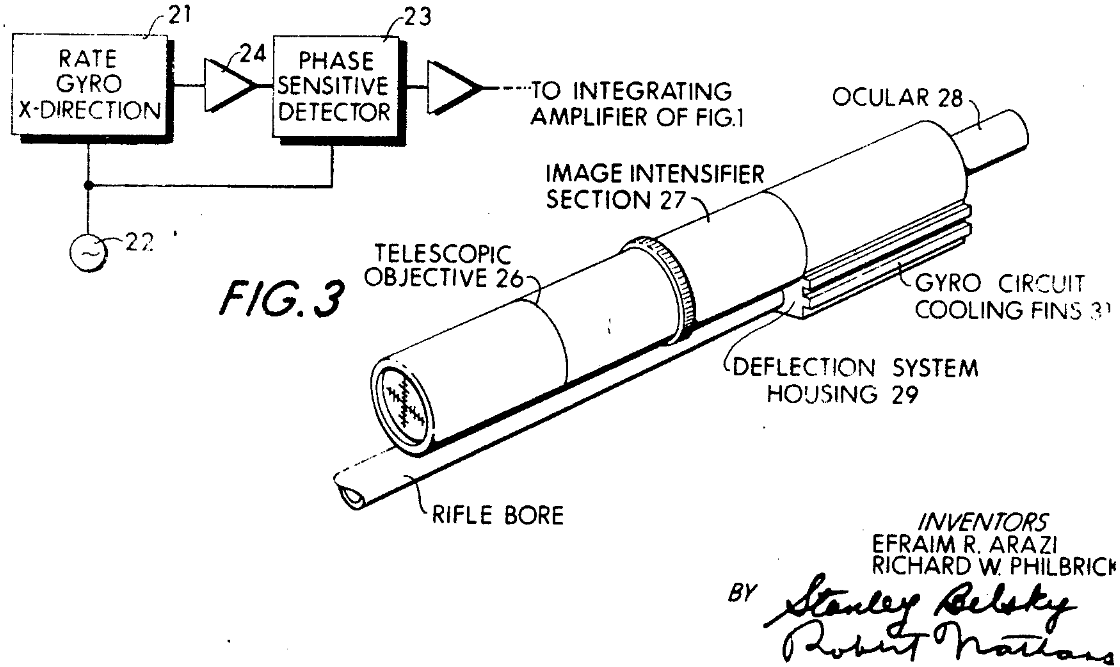

FIG. 2 discloses the gyro circuit of FIG. 1.

FIG. 3 discloses a telescope or gunsight built in accordance with the present invention.

Figure 4:
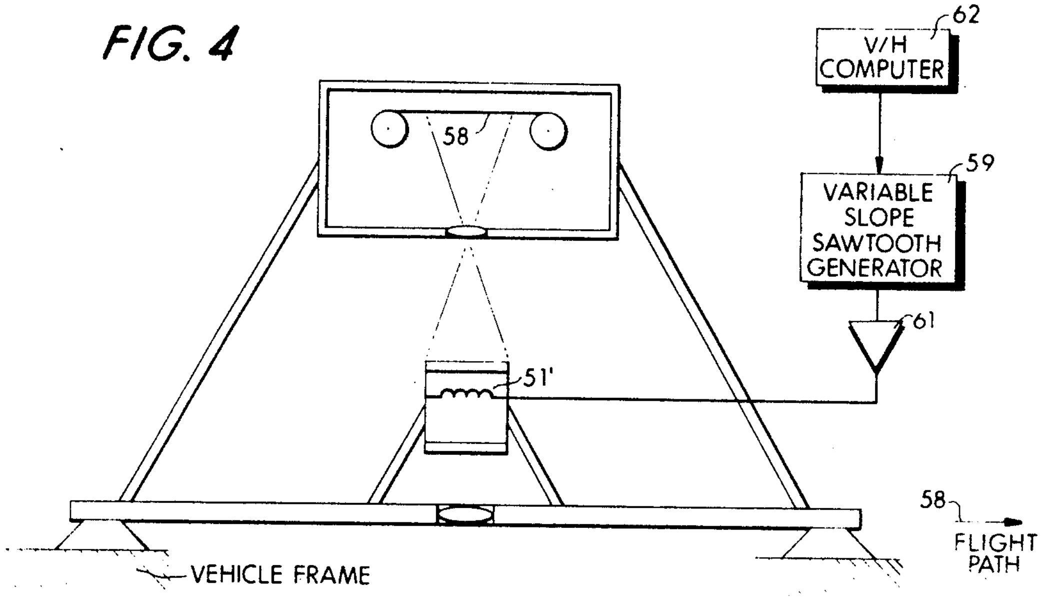
Figure 5:
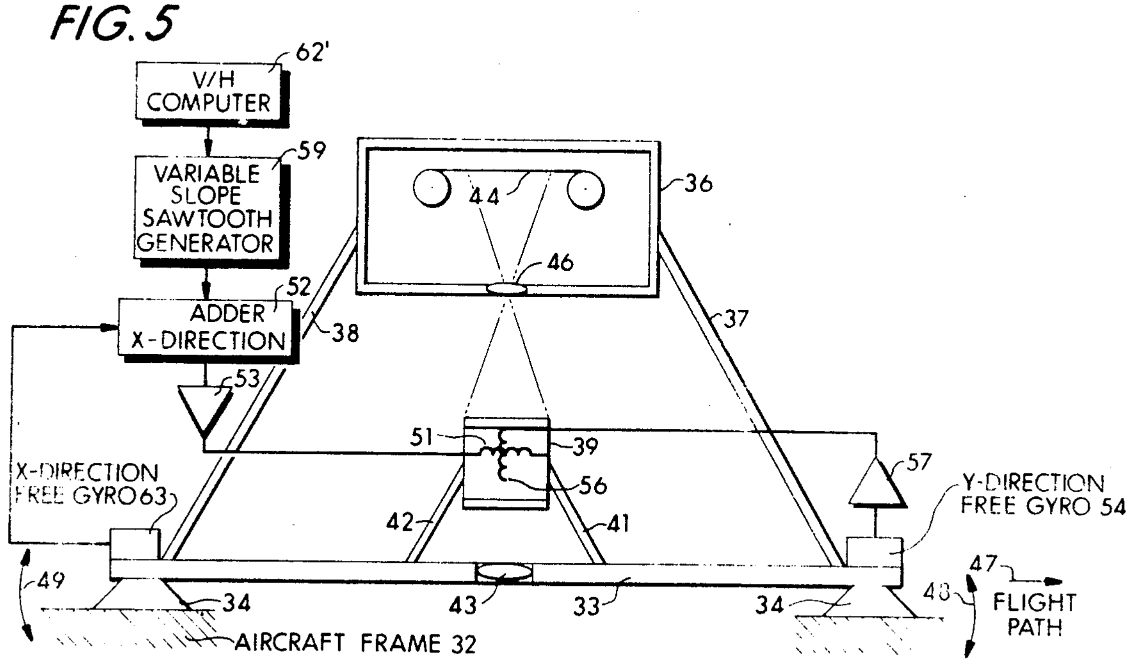

FIGS. 4 and 5 disclose embodiments of the present invention which have particular applicability to aerial reconnaissance photography.

Figure 6:
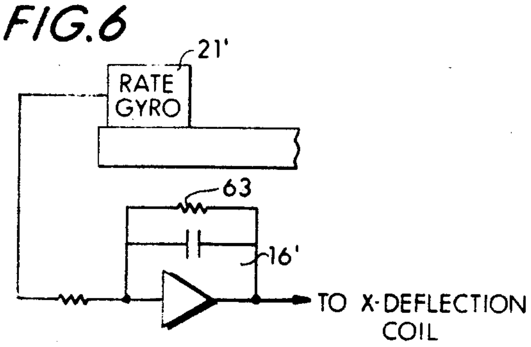

FIG. 6 discloses an integrator circuit utilized in conjunction with the embodiments of the invention.

Figure 7:
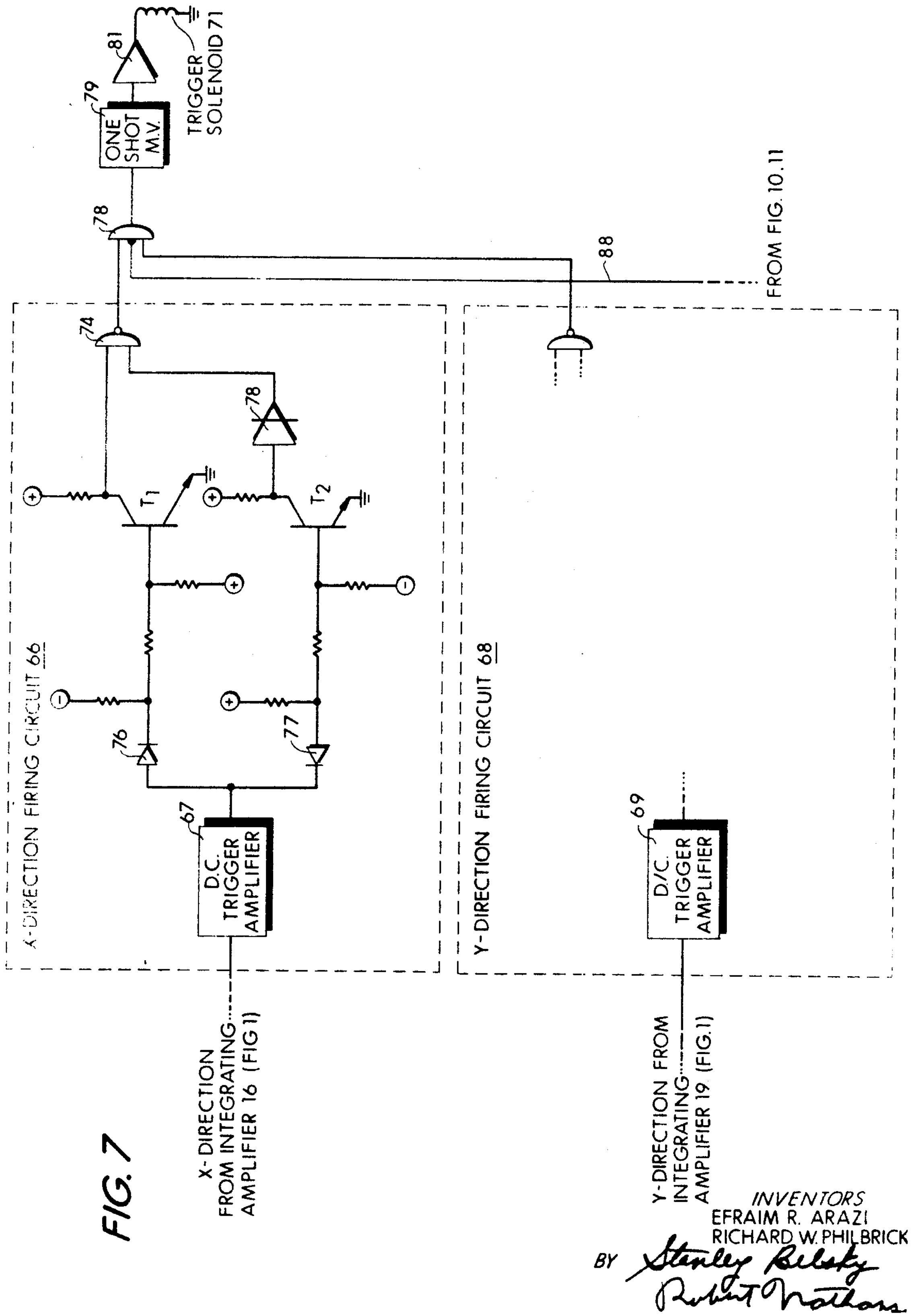

FIG. 7 discloses electronic circuitry utilized in a novel fire control system embodying the present invention.

Figures 8, 9, 10, 11:
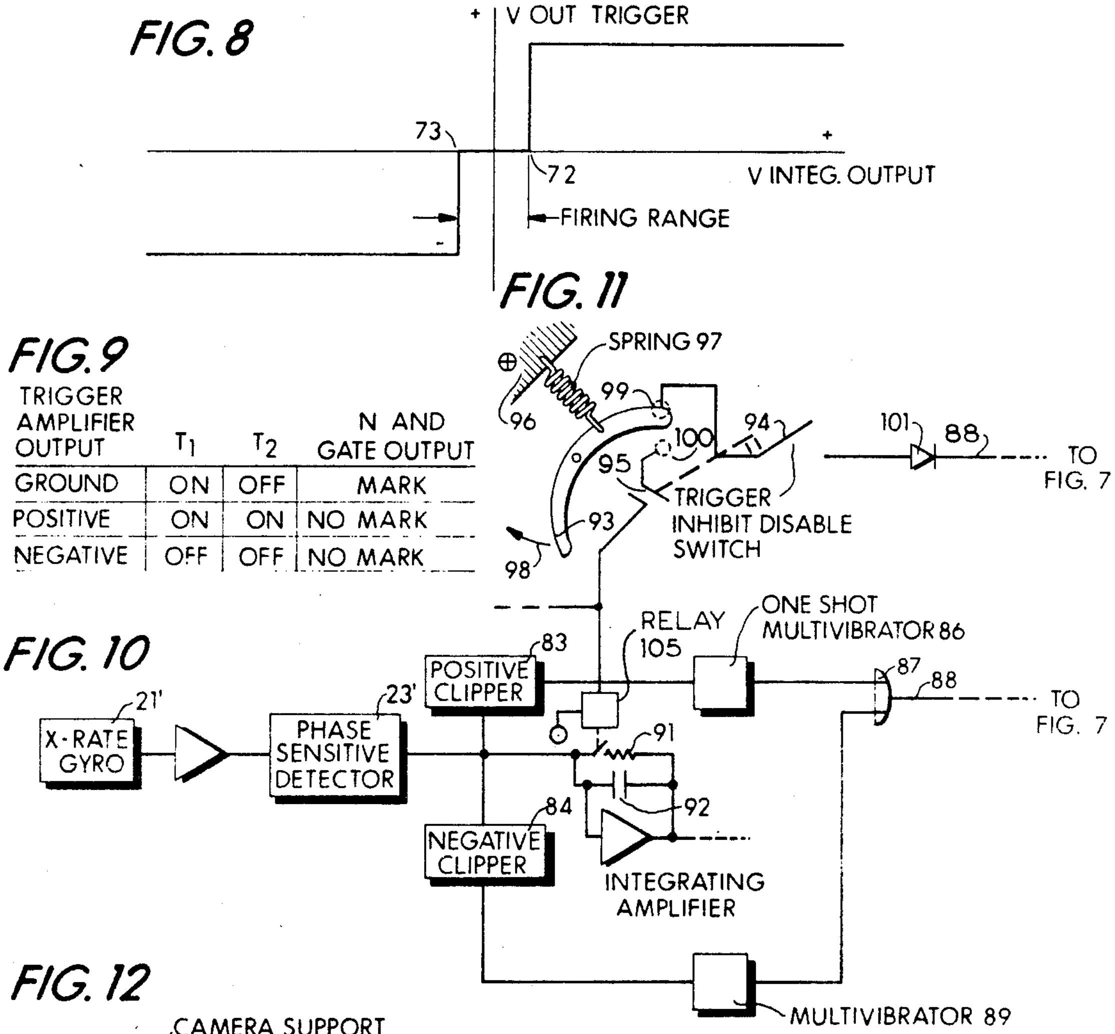

FIG. 8 discloses a graph illustrating the operation of the trigger amplifiers of FIG. 7.

FIG. 9 discloses a logic table illustrating the operation of the firing circuits.

FIG. 10 discloses a weapon velocity inhibit circuit.

FIG. 11 discloses a trigger pressure inhibit circuit.

Figure 12:
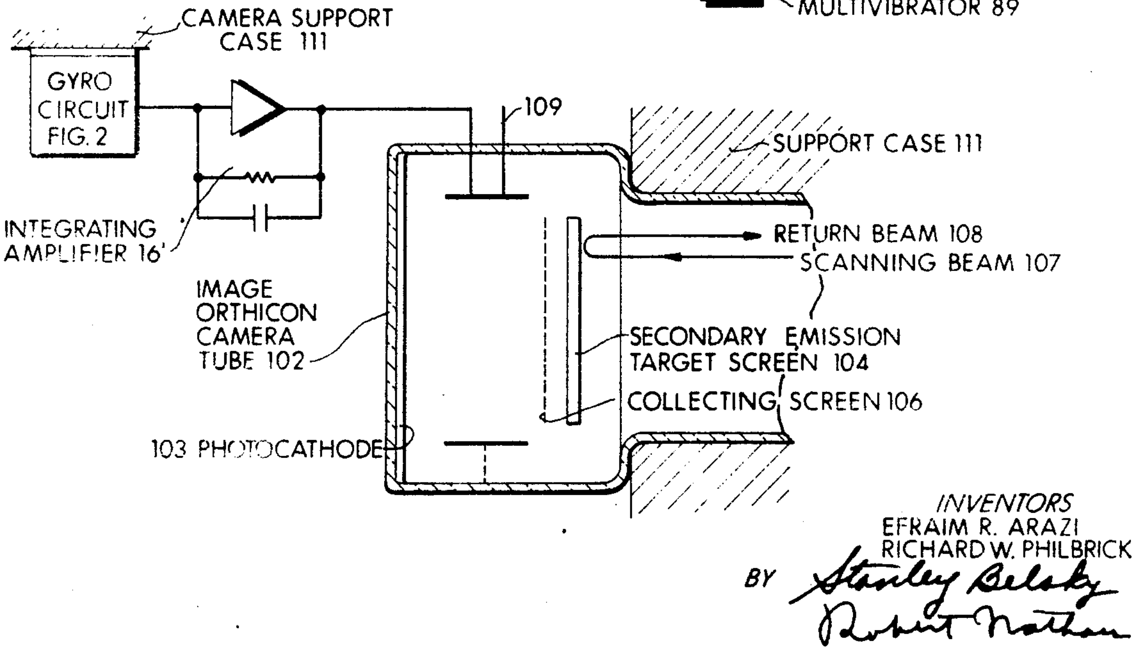

FIG. 12 discloses an embodiment of the present invention utilized in the television field.

In accordance with the present invention an optical viewing means is positioned upon a support member such as the frame of a vehicle, weapon, or a camera case along with imaging means which generally include an objective lens and an image converter or intensifier which focuses the image of the viewed object at the viewing means. Random motions of the support member which cause the aforesaid image "dance" are converted into X and Y electrical signals proportional to the direction and degree of "dance." These signals are applied to a deflecting system which causes the electron image bundle generated within the image converter to be deflected by an amount and in a direction to cancel that image motion which would otherwise occur due to motions of the support member in the absence of the deflecting system.

FIG. 1 discloses a camera 1, which could be hand-held, having a light tight case 2 and an objective lens 3, positioned at one end of the case, as shown. An image converter or intensifier tube 4, focusing lens 5, and film 6 are positioned along optical axis 7 as shown. Film 6 is positioned within focal plane 8 and is supported and actuated by rollers 9. Image converter tube 4 and focusing lens 5 are, of course, affixed to case 2.

A scene to be photographed is imaged upon photoemissive screen 11 by lens 3. As photons strike the photoemissive screen 11, coated on the inside of the evacuated envelope of the image converter, several electrons are emitted for each photon. Focusing and accelerating electrodes, not shown, but contained within image converter 4, cause the electron bundle composed of a number of electron streams to be focused upon phosphor target screen 12. Since the intensity of the electron streams emitted by incremental areas of the photoemissive screen are proportional to the intensity of light falling upon these incremental areas, it follows that the total electron bundle making up the numerous electron streams, represent the viewed scene, and will be reconverted into an optical image by the phosphor target screen 12. In the preferred embodiment of the present invention, the optical image focused upon screen 11 will be amplified owing to the acceleration of the electron streams within the image converter or image intensifier 4. However, the image need not necessarily be amplified. For a discussion of various types of image converters see Van Nostrand's Scientific Encyclopedia, Third edition, January 1958, page 860.

An X direction rate gyro circuit 13 is electrically coupled to magnetic deflection yoke 14, which is associated with image converter 4, through integrating amplifier 16. Likewise, Y direction rate gyro circuit 17 is coupled to Y direction magnetic deflection yoke 18 through integrating amplifier 19.

Gyro circuits 13 and 17 are well known to those skilled in the art. FIG. 2 schematically discloses the major components of gyro circuits 13 and 17, however.

It should be appreciated at this point that the aforesaid image motion or "dance," which is to be cancelled out by the present invention, is due primarily to angular motion of camera 1 about optical axis 7. As mentioned hereinbefore, the angular X and Y direction motions of camera 1 is detected by transducer means associated with the camera and causes electrical fields to be set up within image converter 4 in a direction and by an amount to cancel the "dance" effect which would otherwise be produced in the absence of the deflecting means. Accordingly, the gyro circuits 13 and 17 together with their associated integrating amplifiers 16 and 19 cause currents to pass through yokes 14 and 18 proportional to angular displacement of the camera axis. X direction rate gyro 21 of FIG. 2 is supplied with a 400 cycle, 26 volt, carrier signal produced by AC generator 22. The output of the gyro is applied to a phase sensitive detector 23 via amplifier 24. The phase sensitive detector 23 is also supplied with a reference signal which is the same as that signal applied by AC source 22 to rate gyro 21. The amplitude modulated carrier applied to phase sensitive detector 23 by the rate gyro will be amplitude modulated in accordance with the instantaneous angular velocity of the camera with respect to the gyro axis. The direction of the angular velocity will be indicated by the relative phase of the AM carrier produced by rate gyro 21 with respect to the reference signal applied to detector 23. In other words as the angular velocity of the gyro increases in a first direction with respect to the camera case 2, the amplitude of the low frequency detected signal increases and has a positive polarity. Where this angular velocity decreases in the first direction the amplitude of the detected signal decreases but is still positive. On the other hand if the angular velocity direction is reversed, a negative signal will be produced by detector 23, the amplitude of which is proportional to the instantaneous angular velocity of the gyro with respect to case 2. Accordingly, it should be appreciated that the output of detector 23 produces an AC voltage wave shape which represents instantaneous angular velocity against time, which wave shape which will be both positive and negative depending on the instantaneous direction of the angular velocity of motion of the case with respect to the gyro axis. As is also well known to those skilled in the art, the integration of such a wave shape produces a wave shape which represents the instantaneous position of the case with respect to the gyro axis both to the left and to the right of the null position. Accordingly, it should be understood that the instantaneous position of the camera case about a null, "home" or "on target" position will cause an electrical field to be set up within image converter 4 proportional to such deviation. Thus the electron image within the converter becomes "frozen." Of course, the Y direction gyro circuit 17 would be identical with X gyro circuit 13, so that the composite "pitch" and "yaw" deviations of the camera case about the "target" viewing position will enable image motion or "dance" to be completely cancelled out. The resulting photos taken by the inventors have been clear and distinct where they would otherwise have been smeared beyond recognition.

It should be understood that, if desired, electrostatic deflection plates may be utilized in image converter or image intensifier 4 in place of the magnetic deflection yokes. However, the use of magnetic deflection yokes are preferable in view of the elimination of high voltage power supplies. It should also be understood that although in the preferred embodiment image converter 4 will act as an optical image intensifier, light amplification by means of the operation of image converter 4 is not essential where the scene to be viewed is sufficiently bright. The actual image tube utilized in one camera built by the inventors was an RCA C33004B (development type) tube. The yokes were produced by Syntronics Instruments Incorporated, Model No. C3440Y19580. The gyro was a U.S. Time Model 60 while the amplifiers were Philbrick P65/A operational amplifiers.

A terrestrial telescope was built by the inventors in accordance with the present invention and is schematically shown in FIG. 3. The telescope comprises telescopic objective 26, image converter or intensifier section 27, ocular 28 and the deflection system housing 29 which includes the gyroscopes. Cooling fins 31 were formed on the outside of housing 29 in order to provide for gyroscope cooling. Owing to telescopic objective 26, distant objects are viewed by the telescope and, therefore, it should be apparent that slight motions of the telescope will cause the image viewed by the observer by means of ocular 28 to "dance" about. A telescope manufactured in accordance with the present invention will eliminate this "dance" so that details of the distant scene which is viewed by the telescope may be rapidly and readily discerned without the accompanying operator fatigue which occurs through the use of standard telescopes. The telescopic objective 26 focuses the distant scene upon the photo-emissive screen of the image intensifier tube and the ocular 28 focuses the image produced by the phosphor target screen at the retina of the observer or in the alternative at a photographic plate. This embodiment is otherwise similar to FIG. 1.

FIGS. 4 and 5 schematically disclose aerial cameras which embody the present invention. As mentioned hereinbefore, the use of highly stabilized platforms to prevent camera motion owing to "pitch" and "yaw" of an aircraft are extremely expensive, cumbersome, and complex.

In FIG. 5 the frame or body of the aircraft 32 supports platform 33 by means of shock mounts 34 which prevent high frequency vibrations of the aircraft frame 32 (i.e.

frequencies above 40–60 cycles per second) from vibrating the image intensifier or camera element relative to each other or otherwise. Camera 36 is schematically shown rigidly mounted upon platform 33 by means of struts 37 and 38. Likewise image intensifier 39 is rigidly affixed to platform 33 by means of struts 41 and 42. It should be appreciated that platform 33 together with aircraft frame 32 form a composite support member for the camera system. Objective lens 43 is schematically shown mounted within the support platform and focuses the scene to be photographed on the photo-emissive screen of image converter 39 as in the embodiment of FIG. 1. The optical image produced by the phosphor target screen of image converter 39 is likewise focused upon film 44 by means of lens 46. The flight path of the aircraft is schematically represented by arrow 47 while the "pitch" of the aircraft is represented schematically by arrows 48 and 49. In this embodiment the "pitch" of the aircraft will be termed the X direction camera support deviation, while the "yaw" of the aircraft will be represented by the Y direction angular deviation. It should now be understood that for a given frame or (take) the "pitching" and "yawing" will cause a certain degree of image smear so that resolution is thereby degradated. In accordance with the present invention these effects of "pitch" and "yaw" upon the image produced at the camera focal plane is cancelled out, just as the image motion due to the aforementioned cameras and telescope motions are cancelled out.

In these embodiments free gyros are utilized rather than rate gyros, so that the integration amplifiers discussed hereinbefore may be omitted. However it should be understood that rate gyros together with their associated integrating amplifiers on accelerometers together with their associated double integrating amplifiers may also be utilized.

The output circuit of X direction free gyro 63 is electrically coupled to the X direction magnetic deflection coil 51 via adder 52 and amplifier 53. In view of the previous description of the embodiment of FIG. 1, it should be apparent that image motion or "dance" at film 44 due to the pitching of the aircraft will be effectively cancelled out by means of magnetic deflection coil 51. Likewise image motion due to the yaw of the aircraft is cancelled out by means of Y direction free gyro 54 which is coupled to Y direction magnetic deflection yoke 56 via amplifier 57. Thus the "up" and "down" pitch motion of the aircraft will cause currents to flow through the X direction magnetic deflection coil 51 in a direction depending upon whether the instantaneous pitch is "up" or "down" and in an amount depending upon the degree of said deviation. Likewise "left" and "right" yaw deviations will cause currents to flow in opposite directions through deflection coil 56 and in an amount depending upon the degree of said yaw.

The purpose of adder 52 will become apparent upon the inspection of FIG. 4. The flight of the aircraft is schematically disclosed by arrow 58. As is well known to those skilled in the art of aerial reconnaissance, there will be an apparent image motion at the camera focal plane owing to the forward motion of the aircraft, the degree of this image motion being proportional to the well known $V/H$ ratio, where V is the relative velocity of the aircraft with respect to the ground where the ground is being photographed, and H is the altitude of the aircraft. It should be apparent that the higher the velocity of the aircraft with respect to the ground scene being photographed the greater the apparent image motion at the camera focal point. On the other hand, the greater the altitude the aircraft with respect to the ground scene the less the degree of apparent image motion at the focal plane of the camera. In the prior art the $V/H$ ratio is determined, and from that determination the film is intentionally moved during each "take" an amount proportional thereto, so that the film "chases" the moving image at the camera focal plane and as a result smear is considerably reduced and resolution is greatly improved. This intentional film motion within a given frame or "take" has been eliminated by the inventors by means of applying a sawtooth waveform to the X direction magnetic deflection coil 51' and consequently intermittent film motion during a given frame or "take" is no longer needed. In the absence of the application of a sawtooth wave to magnetic deflection coil 51', the image would move to the right on film 58. However, the increasing magnetic field produced by the sawtooth wave applied to deflection coil 51' will "freeze" the image so that there is no apparent image motion with respect to the camera focal plane, thereby to eliminate the complex mechanism for moving the film during a given frame. The output circuit of variable slope sawtooth generator 59 is coupled to X direction magnetic deflection coil 51' through amplifier 61, as shown in FIG. 4. As is well known to those skilled in the art, the slope of the waveform produced by sawtooth generator 59 may be varied by varying the value of the capacitor or resistor in the RC circuit of the generator. $V/H$ computer 62, therefore, will vary the time constant of the RC timing circuit within the sawtooth generator in proportion to the computed $V/H$ ratio, to alter the slope of the waveform and hence the degree of image motion cancellation as required by the particular $V/H$ ratio.

It is often desirable to optically "freeze" a viewed portion of an item mounted upon a shaker table, which is used to vibrate the item mounted thereon in a known mode, such as a sinusoidal mode. One method of "freezing" the viewed portion would involve the use of a stroboscope, which produces an intense light flash having a very short duration relative to the vibrational period of the table, which flash is synchronized with the frequency of vibration of the shaker table. However, if the flash frequency is not quite synchronized with the shaker table frequency, which is often case, the viewed portion of the item on the table will appear to slowly move, or drift, which of course is undesirable. Another method of accomplishing the foregoing is to utilize the system disclosed in the aforesaid Arazi application. A third method is available utilizing the teachings of the present invention. The image motion of the viewed portion of the item mounted upon the shaker table is generally known and controlled so that transducer means may be mounted upon the table or upon the table drive shaft to produce electrical signals proportional to the instantaneous position of the table. For example, where the table vibrational mode is sinusoidal, an AC generator may be driven by the table drive shaft and the signals produced thereby would be applied to the deflection coils of the image intensifier in a manner to "freeze" the image in accordance with the aforesaid teachings of the present invention. Should the table or base support member of the viewed item have a vibrational mode which is not predetermined, a transducer may be mounted upon the table thereby to produce an electrical signal proportional to the displacement of the table, against time, as in the foregoing embodiments.

In a high speed motion picture camera, where the film is continuously driven through its focal plane at high speed, a prism is rotated to cause the image to "chase" the film, thereby to eliminate relative motion between the image and the film, to in turn produce a distinct picture. Since the film motion rate is known, it may be seen that the rotating prism may be replaced by the stationary image converter whose deflection coils are supplied by current from a signal generator proportional to the instantaneous displacement of the moving film from a starting datum during a given "take," all in accordance with the teachings of the present invention. Of course, if electrostatic plates are utilized as part of the image intensifier deflection means, a high voltage would be applied to the plates proportional to the film displacement from the starting datum position.

In FIG. 5 $V/H$ analog computer 62' is connected to variable slope sawtooth generator 59 in accordance with the discussed arrangement of FIG. 4. The output circuit of sawtooth generator 59 is applied to a first input terminal of analog adder 52, while the output circuit of X direction free gyro 63 is coupled to the second input terminal of adder 52. Since the apparent image motion at the camera focal plane is a function of both the random "pitch" of the aircraft and the aforesaid *V/H* ratio, it should now be apparent that the output voltages of sawtooth generator 59 and free gyro 63 should be added to so that current may be applied by amplifier 53 to deflection coil 51 proportional to the composite image motion and in a direction to thereby oppose said motion so as to "freeze" the viewed image at the focal plane of camera 44.

Frequently, the hand held camera disclosed in the FIG. 1 embodiment, the terrestrial telescope shown in FIG. 3 and cameras mounted upon various vehicles such as the cameras disclosed in FIGS. 4 and 5, are slowly panned; that is their longitudinal axis are angularly rotated to follow a moving object for instance, or to view a different portion of the earth's surface. In the case of the hand held camera the longitudinal axis never will be angularly rotated to follow a moving object above 2 cycles per second. However, in order to prevent this very low frequency oscillation from affecting the current in the deflection coils, thereby to displace the entire field of view, a "leaky" integrator shown in FIG. 6 was developed. In order to prevent integrator circuit 16′ from responding to the positioning of the camera which woiuld cause gyro 21′ to produce frequencies below 2 cycles, resistor 63 is connected in shunt with the integrating capacitor of integrating circuit 16′ as shown in FIG. 6. The value of the resistor is chosen relative to the value of the capacitor such that the integrator capacitor will not charge up due to currents produced by signals applied thereto below 2 cycles a second. In other words resistor 63 will drain the capacitor to prevent charging at these frequencies. Where a one microfarad integrating capacitor was utilized in conjunction with Philbrick P65 operational amplifier a satisfactory value of resistor 63 was found to be 500 ohms.

By the employment of a telescope such as shown in FIG. 3, and by use of additional electronic circuitry such as disclosed in FIG. 7, a novel electronic gun sight and automatic firing control system may be fabricated in accordance with the present invention. Cross hairs are provided within objective 26 or elsewhere in the optical train on the target side of the image converter. The telescope is mounted on a weapon such as a rifle. In the absence of the aforesaid teachings of the present invention the point of intersection of the cross hairs will "dance" about the target in response to random motion of the weapon due either to body motion of the individual aiming the weapon or due to the movement of a vehicle upon which the individual is being carried. With the telescope of FIG. 2, fabricated in accordance with the present invention, this "dance" will cease and the cross hairs will appear stationary with respect to the target scene since the cross hair image will form part of the target image applied to the photo-emissive screen of the image converter. However the longitudinal axis of the rifle bore is still randomly and angularly gyrating about the target axis which may be described as the straight line between the actual target and the bullet in the bore situated at the firing position. As explained in detail hereinbefore, when the angular deviation of the longitudinal axis of the optical system with respect to the "home" position is zero in both the X and Y directions, the integrating amplifiers will produce zero voltage outputs so that no current flows in the X and Y deflection coils, and consequently the image intensifier tube. At some instant during the aforesaid period of angular gyration of the longitudinal axis of the bore of the weapon about the target axis, the bore axis and target axis will coincide and the aforementioned zero voltage conditions at the output of both the X and Y integrating amplifiers will occur. In accordance with the present invention, this condition is virtually instantaneously sensed electronically, and a sharp pulse is applied to a firing device such as a trigger solenoid. Statistically speaking, this "on target" voltage condition should occur very shortly after the initial citing of the target. It is conceivable that this condition could also be sensed by the detection of a lack of magnetic or electric field within the image intensifier rather than utilizing the zero output voltages at both of the integrating amplifiers to make this determination.

An optional inhibiting circuit is also provided for preventing the energization of the trigger solenoid even though the aforesaid zero voltage conditions are present at the output of both X and Y integrating amplifiers. The inhibition of the actuation of the trigger solenoid will be produced, unless a minimum trigger pressure exists upon the trigger, indicating that the individual handling the fire arm is set and does intend to actually fire the weapon at this time. Additionally, should the angular velocity of the longitudinal axis of the bore be greater than a predetermined amount an inhibit condition is produced which prevents energization of the trigger solenoid. Where the angular velocity of the weapon is quite high, it may be seen that by the time the bullet emerges from the barrel, the bore axis and the target axis will be slightly but significantly displaced from one another, so that the target might be missed, particularly if the target is small; or putting it another way, the bullet direction as it emerges from the bore will be slightly but significantly different from the direction of the bullet axis upon being fired.

The telescope of FIG. 3 is mounted upon a weapon such as a rifle and the circuitry to be discussed hereinafter is added to the basic system of FIGS. 1–3.

FIG. 7 discloses the X and Y direction firing circuits together with circuitry responsive to each firing circuit for actuating a trigger solenoid, which fires the weapon. X direction firing circuit 66 is coupled to the output circuit of X direction integrating amplifier 16, while Y direction firing circuit 68 is coupled to the outlet circuit of Y direction integrating amplifier 19. The purpose of X and Y direction firing circuits 66 and 68 is to set the stage for the actuation of trigger solenoid 71 when the aforementioned zero deflection condition is present within the image intensifier 2, thereby to indicate that the longitudinal bore axis of the weapon is coincident with the target axis. DC trigger amplifiers 67 and 69 may be any amplifiers having the voltage characteristics disclosed in FIG. 8. When the output voltage of an integrating amplifier becomes more positive than point 72, the output voltage of the trigger amplifier will sharply rise to a relatively large positive voltage as shown by the graph. On the other hand, should the negative voltage produced by the integrating amplifier output exceed the voltage represented by point 73 of FIG. 8, the output voltage of the trigger amplifier will go sharply negative as shown. Points 72 and 73 are extremely close to the aforesaid zero voltage condition so that between points 72 and 73 the stage will be set for the actuation of trigger solenoid 71. This type of double trigger amplifier is readily available. Type D–9505 operational amplifier, manufactured by Signetics Integrated Circuits of Sunnyvale, Calif., may be utilized. If desired, twin Schmitt triggers may be utilized in place of such an amplifier to obtain the wave form of FIG. 8, as is well known to those skilled in the circuit design field.

The electronic circuitry of FIG. 7 is a logic circuit which will, under certain conditions besides the coincident production of the "zero" voltage conditions at the output circuits of the integrating amplifiers, cause energization of trigger solenoid 71.

X and Y direction firing circuits 66 and 68 will cause a mark to be produced by nand (nor-and) gate 74 upon the simultaneous production of the "zero" voltage condition at the output circuits of the integrating amplifiers which as explained earlier indicate the coincidence of the longitudinal bore axis of the weapon with the target axis. FIG. 9 discloses a table which sets forth the logic performed by each firing circuit. The "ground" trigger amplifier output (72–73) is the firing range area shown in FIG. 8 and is indicative the "zero" output voltage condition. As shown by the table, a mark (positive) will be produced by nand gate 74 only where the ground or "zero" voltage condition is simultaneously present at the trigger amplifier outputs.

A ground condition at the output circuit DC trigger amplifier 67 causes N-P-N transistor T–1 to assume the conductive or "on" condition. As diode 76 becomes forward biased so that the voltage at the base of transistor T–1 goes positive with respect to the emitter. This ground condition at the output circuit of trigger amplifier 67 also forward biases diode 77 which causes the base of transistor T–2 to go negative with respect to the emitter, to cause N-P-N transistor T–2 to assure the "off" condition. With T–1 in the "on" condition, ground (no mark) is applied to the first input terminal of nand gate 74. With T–2 "off" a positive voltage is applied to inverter 78, which also produces a ground (no mark) condition at the second input terminal of nand gate 74. Under these conditions, and only under these conditions, a positive mark will be produced at the first input terminal of and gate 78 (as nand gate 74 is fully enabled) thereby to partially enable gate 78. In like manner the production of a ground or "zero" voltage at the output terminal of DC trigger amplifier 69 causes a positive mark to be produced by Y direction firing circuit 68 at the second input terminal of and gate 78, thereby to further enable this and gate. Excluding for a moment the function of the inhibit terminal of and gate 78, it should now be seen that the simultaneous production of "zero" voltage conditions at the output circuits of the integrating amplifiers will cause and gate 78 to be fully enabled, thereby to actuate a one shot multi-vibraor 79, which in turn energizes amplifier 81 to operate trigger solenoid 71. Details of the Y direction firing circuit 68 have been omitted since this circuit is identical with X direction firing circuit 66. Should a positive voltage output be produced by trigger amplifier 67, T–1 will be turned on and T–2 will also be turned on. Under these conditions inverter 78 will cause a positive voltage to be applied to the second input terminal of nand gate 74, and as a result no mark may be produced by the nand gate at this time and thus and gate 78 is disenabled and trigger solenoid 71 may not be actuated. On the other hand should the output voltage of trigger amplifier 67 be negative, T–1 will be "off" and a positive voltage (mark) is applied to the first input terminal of nand gate 74, thereby to prevent the production of a mark at the output terminal of the nand gate.

FIG. 10 discloses circuitry which inhibits the aforesaid operation where the angular bore velocity exceeds a given predetermined amount in either a positive or negative direction, that is, either swinging from left to right or right to left. When this angular velocity is exceeded in either direction, it is desired to inhibit the actuation of trigger solenoid 71 since the angular momentum of the bore will cause the bullet to miss the target as previously mentioned. X direction rate gyro 21' is shown coupled to phase sensitive detector 23' which are components disclosed in FIG. 2 and discussed hereinbefore. It may be recalled that the amplitude of the output voltage produced by phase sensitive detector 23 is proportional to the angular velocity of the bore. The polarity of this voltage is indicative of the direction of the bore; that is swinging right to left or left to right. Positive clipper 83 and negative clipper 84 are coupled to the output circuit of phase sensitive detector 23', as shown in FIG. 10. Upon the occurrence at the output circuit of detector 23' of a positive voltage greater than a predetermined amount, which indicates an angular velocity above a predetermined amount, a signal will be produced in the output circuit of positive clipper 83, thereby to actuate one shot multi-vibrator 86, which in turn causes a mark to be produced at the first input terminal of or gate 87. This mark is forwarded over conductor 88 to the aforesaid inhibit input terminal of and gate 78, thereby to inhibit the actuation of trigger solenoid 71 which might otherwise occur. On the other hand should the output voltage of phase sensitive detector 23' exceed a predetermined amount in the negative direction, negative clipper 84 will cause the actuation of one shot multi-vibrator 89, which causes a mark to be produced at the output terminal of or gate 87, thereby to inhibit and gate 78 to prevent the actuation of trigger solenoid 71.

It will often be desirable to further inhibit the operation of firing circuits 66 and 68 where an angular velocity on the Y (up-down) direction exceeds a predetermined value. This is accomplished by merely providing a second inhibit circuit such as the circuit of FIG. 10, having its input coupled to the Y rate gyro circuit and having its output coupled to inhibit conductor 88.

As in the case of cameras and telescopes, television pick-up devices, etc. we do not wish the panning of slow rotation of positioning of the rifle to have any affect upon current flowing through the deflection coils of the image converter except during stationary target shooting as explained hereinafter. We are generally interested in examining those frequencies above 1 or 2 cycles per second which represent wobble of the rifle bore so that we may hit the target. Accordingly, resistor 91 is connected in shunt with capacitor 92 as in the panning circuit disclosed in FIG. 6, and discussed hereinabove.

FIG. 11 discloses an inhibit circuit which may be utilized to inhibit the enabling of and gate 78 as long as a minimum predetermined trigger pressure is not being applied to trigger 93. In other words if the individual handling the weapon is not "set," although the electronic circuitry is fully enabled, we do not generally wish to actuate the trigger solenoid. If this inhibit circuit is connected, by closing switch 94, for careful studied target shooting, the weapon will not be fired until the individual bearing the firearm is in the "set" position. On the other hand should the individual bearing the firearm be engaged in jungle warfare or the like, time may be of the essence so that we would want to disenable this inhibit circuit by opening switch 94. Trigger 93 is connected to a portion of the rifle frame 96 by means of spring 97. The trigger 93 is actuated in the direction indicated by arrow 98. A stationary contact member 99 is in brushing relationship with a metallic surface of trigger 93. When trigger 93 is moved in the direction indicated by arrow 98 and a predetermined trigger pressure has been produced by spring 97, spring contact 99 is completely "uncovered" so that it is no longer in metallic electrical contact with trigger 93. Metallic rifle frame portion 96 has a positive voltage thereon so that a positive mark is produced at the anode of diode 101, to in turn produce a positive mark on inhibit conductor 88 of FIG. 7, as long as contact 99 is covered, thereby to inhibit the actuation of trigger solenoid 71. However when the predetermined trigger pressure is exceeded, and contact 99 is no longer electrically contacting trigger 93, the positive voltage which was previously applied to the anode of diode 101 is removed so that a mark is no longer applied to and gate 78 to inhibit it. Thus is should be apparent that when switch 94 is closed, and a predetermined trigger pressure has been produced, the positive voltage normally applied to the anode of diode 101 is removed and the inhibit condition is no longer produced by the circuit of FIG. 11. By opening switch 94, this inhibit circuit is no longer operative.

Regarding stationary targets, let it be assumed that the bearer of the weapon is pointing same away from the target area. Typically he would swing the weapon around until it comes to rest in the general target area. If desired, image stabilization could be off at this time and a switch could be provided to enable the bearer to enable the stabilization system upon the weapon coming to rest in the general target area, thereby to "freeze" the viewed target image. However, for studied stationary target shooting, it would be undesirable to fire the weapon at this time although the aforesaid zero current (no wobble) conditions through the coils might be present. However, pressure would not yet be exerted on trigger 93 so that the trigger solenoid is disenabled by virtue of electrical contact 99, as previously explained. The bearer of the weapon now causes the cross hairs to be placed directly over the center of the target and at this time squeezes the trigger thereby to "uncover" electrical contact 99 which enables previously inhibited gate 78 to in turn enable the firing circuit. Statistically speaking the zero current condition will now be produced in a very short time so that the weapon is fired upon the coincidence of the target axis and the bore axis as explained in detail herein before.

Just as contact 99 is uncovered, trigger 93 contacts button 100, which causes the energization of relay 105 via closed switch 95, to in turn disconnect resistor 91 of both X and Y integrating amplifiers thereby to disenable panning. It is desirable to disenable panning at this time because otherwise it is possible for the bore axis to slowly wander or drift slightly off target and thereafter manifest at a new settling position a "no wobble" or zero current condition through the X and Y deflection coils, to in turn fire the weapon. If panning were on, the voltage produced by the gyros due to the aforesaid low frequency drift would not be recognized by the RC circuit of the leaky integrator-amplifier and thus the weapon might fire and miss the target. With panning off, a charge would be built up in at least one of the integrating capacitors due to this drift and would prevent the actuation of the fire control circuits as previously explained. Unless and until the bore axis is repositioned back to the target axis, this charge would not be removed from the integrating capacitors and the system would not fire. As explained hereinbelow, panning is on when a moving target is tracked. Under this condition trigger inhibit switch 94 is opened to in turn open ganged switch 95, thereby to prevent trigger pressure from disenabling panning.

A further refinement may be added which allows the bearer of the firearm to pull the trigger all the way back to an extreme position to thereby over-ride all of the aforesaid electronic circuitry and cause the weapon to be manually fired. Such a circuit would merely involve the introduction of a contact button such as button 99, positioned to be covered by trigger 93 upon the full backward position of the trigger, which in turn could complete an electrical circuit to actuate the trigger solenoid.

If it is desired to fire at a moving target, the aforesaid stabilization switch is thrown on to effect image stabilization in accordance with the present invention, while trigger inhibit switch 94 is opened so that the fire control system is fully enabled while the moving target is being optically tracked. If inhibit disable switch 94 were not opened, the bearer of the weapon would have to pull the trigger partially back while following the moving target, which might accidentally cause the aforesaid over-ride firing condition to be met and the weapon would be inadvertently fired. As soon as the aforesaid zero current condition is met during tracking, the weapon would automatically fire.

FIG. 11 discloses the present invention as utilized in a television environment. An image orthicon camera tube 102 is disclosed, having a photo cathode 103 for converting the televised optical scene into an electron image. Electrons making up the image are accelerated and focused upon secondary emission target screen 104. The electrons which are secondarily emitted are collected by collecting screen 106 and the resulting charge variation upon secondary emission target screen 104 is sensed by scanning beam 107 which becomes intensity modulated in accordance with this charge pattern, so that the return beam 108 produces a serial video signal train in accordance with the scene being viewed. All of the foregoing is completely conventional. For a more complete discussion and disclosure of an image orthicon tube see page 860 of Van Nostrand's Scientific Encyclopedia, Third edition, 1958. In accordance with the present invention two pairs of electron image deflecting plates 109 are introduced into tube 102, as shown, thereby provide means for deflecting the electron image. Each pair of plates is coupled to an associated gyro circuit of FIG. 2 through an associated integrating amplifier; the gyro circuits in turn being affixed to the camera support case 111, as shown.

In the absence of deflection plates 109 or equivalent electromagnetic yokes, which of course could be utilized in place of the electrostatic deflection plates, motions of the camera support case would produce the aforementioned image dance at target screen 104. Since the gyro circuits of FIG. 2 are affixed to camera support case 111, this image dance or motion is fully compensated for in the same manner as described hereinabove in connection with the other embodiments of the present invention. Of course, a second pair of deflection plates coupled to a second gyro circuit through a second integrating amplifier are provided but are not shown in FIG. 11 in order to clarify the figure.

The advantages resulting from the use of the present invention in the video field are particularly dramatic where the television camera equipment is mounted on a moving vehicle such as a helicopter, or automobile traveling over rough terrain.

Likewise the present invention would be equally applicable to a movie camera mounted on such a vehicle to thereby stabilize the scene being photographed.

The photoemissive screen of the image converter may be coated to produce an electron image manifesting a pattern of incident infrared radiation, so that the fire control system embodying the present invention may be utilized for night firing where the target is dimly illuminated. In like manner telescopic viewing and photographing in accordance with the present invention may be carried out at night.

While there has been described what is at present considered to be the preferred embodiment of this invention, it will be obvious to those skilled in the art that various changes and modifications may be made therein without departing from the invention and it is, therefore, intended in the appended claims to cover all such changes and modifications as fall within the true spirit and scope of the invention.

What is claimed is:

1. An image motion stabilization system comprising:

(a) a support member;

(b) viewing means for viewing an image;

(c) photosensitive imaging means for imaging an object at said viewing means;

(d) a transducer for indicating motions of support member;

(e) deflection means, coupled to said transducer, for deflecting the image produced by said photosensitive imaging means in response to indications produced by said transducer in a direction tending to cancel a component of image motion caused by the aforesaid motions of said support member, and;

(f) panning control means for rendering said deflection means insensitive to indications produced by said transducer having a frequency below two cycles a second.

2. The combination as set forth in claim 1 wherein said panning control means comprises an integrator having a bleeder device coupled thereto.

3. The combination as set forth in claim 1 wherein said photosensitive imaging means includes an image converter.

4. The combination as set forth in claim 3 wherein said panning control means comprises an integrator having a bleeder device coupled thereto.

References Cited

UNITED STATES PATENTS

| | | | |
|---|---|---|---|
| 2,869,803 | 1/1959 | McGee. | |
| 3,161,725 | 12/1964 | Hotham | 178—7.2 |
| 3,212,420 | 10/1965 | Cierva | 95—12.5 |
| 3,240,942 | 3/1966 | Birnbaum et al. | |
| 3,258,599 | 6/1966 | Zuckerbraun | 250—203 |
| 3,293,360 | 12/1966 | Smith | 178—6.8 |
| 3,371,161 | 2/1968 | Crovella | 178—7.2 |

RALPH G. NILSON, Primary Examiner

M. A. LEAVITT, Assistant Examiner

U.S. Cl. X.R.

250—203